(12) United States Patent
Kiyota et al.

(10) Patent No.: US 8,409,065 B2
(45) Date of Patent: Apr. 2, 2013

(54) BAG MANUFACTURING AND PACKAGING APPARATUS

(75) Inventors: Yusuke Kiyota, Shiga (JP); Hideshi Miyamoto, Shiga (JP)

(73) Assignee: Ishida Co., Ltd., Kyoto (JP)

( * ) Notice: Subject to any disclaimer, the term of this patent is extended or adjusted under 35 U.S.C. 154(b) by 350 days.

(21) Appl. No.: 12/846,111

(22) Filed: Jul. 29, 2010

(65) Prior Publication Data

US 2011/0059833 A1 Mar. 10, 2011

(30) Foreign Application Priority Data

Sep. 10, 2009 (JP) ................................. 2009-209713
Jan. 21, 2010 (JP) ................................. 2010-010857

(51) Int. Cl.
*B31B 1/64* (2006.01)
(52) U.S. Cl. ............ 493/189; 493/205; 53/451; 53/551; 53/373.7; 53/374.5; 53/376.2
(58) Field of Classification Search .................... 53/451, 53/551, 373.7, 374.3, 374.5, 375.4, 376.2; 493/189, 193, 196, 197, 205, 208
See application file for complete search history.

(56) References Cited

U.S. PATENT DOCUMENTS

| | | | |
|---|---|---|---|
| 4,288,968 A | 9/1981 | Seko et al. | |
| 4,433,527 A | 2/1984 | Ramsey et al. | |
| 4,840,009 A | 6/1989 | Rentmeester et al. | |
| 5,868,901 A * | 2/1999 | Smith | 156/582 |
| 6,110,089 A * | 8/2000 | Hatozaki et al. | 493/189 |
| 6,256,969 B1 | 7/2001 | Fragstein | |
| 7,219,483 B2 * | 5/2007 | Adair et al. | 53/451 |
| 2008/0072537 A1 * | 3/2008 | Hashimoto et al. | 53/285 |
| 2009/0090088 A1 * | 4/2009 | Nemkov et al. | 53/477 |

FOREIGN PATENT DOCUMENTS

| | | |
|---|---|---|
| FR | 1-098-132 A | 7/1955 |
| JP | 2007-191197 A | 8/2007 |
| WO | WO-2009-064384 A2 | 5/2009 |

OTHER PUBLICATIONS

Extended European Search Report of the corresponding European Application No. 10173817.7, dated Jun. 28, 2011.

* cited by examiner

*Primary Examiner* — Hemant M Desai
(74) *Attorney, Agent, or Firm* — Global IP Counselors, LLP

(57) ABSTRACT

A bag manufacturing and packaging apparatus is adapted to form a strip film into a cylindrical film. The bag manufacturing and packaging apparatus includes a sealing unit with a pair of sealing members facing each other to seal an end portion of the cylindrical film therebetween to package an article. Each of the sealing members includes a sealing jaw, a heating unit, and a heat insulating member. The sealing jaw has a heat generating surface, and configured and arranged to seal the cylindrical film on the heat generating surface. The heating unit is configured and arranged to heat the heat generating surface of the sealing jaw. The heat insulating member insulates the heat conduction from the heating unit to a direction other than a direction toward the heat generating surface of the sealing jaw.

7 Claims, 9 Drawing Sheets

BAG MANUFACTURING AND PACKAGING APPARATUS

CROSS-REFERENCE TO RELATED APPLICATIONS

This application claims priority to Japanese Patent Application No. 2009-209713 filed on Sep. 10, 2009 and Japanese Patent Application No. 2010-010857 filed on Jan. 21, 2010. The entire disclosures of Japanese Patent Application Nos. 2009-209713 and 2010-010857 are hereby incorporated herein by reference.

BACKGROUND OF THE INVENTION

1. Field of Technology

The present invention relates to a bag manufacturing and packaging apparatus provided with a sealing unit for sealing an end of a cylindrical film.

2. Description of the Background Art

Conventionally, as bag manufacturing and packaging apparatus, a vertical bag manufacturing and packaging apparatus that packages article using a film as conveying the film vertically downward is known. The vertical bag manufacturing and packaging apparatus packages article by forming a strip film into the shape of a cylinder, feeding the article into the film that has been formed into the shape of a cylinder, and then sealing the end portion of the film by heat-sealing. The boundaries between a plurality of packaging bags produced consecutively are cut to produce a plurality of separate package bags.

For example, there is a packaging apparatus such as the following. Japanese Unexamined Patent Application Publication 2007-191197 discloses a packaging apparatus provided with first and second sensing members and first and second adjacent sensors for detecting the space between two sealing jaws when clamping the film.

In this packaging apparatus, a control unit in a packaging unit detects a jam, based on a detection signal from the first and second adjacent sensors, and when a jam is detected, the control unit of the sealing unit stops the clamping operation by a clamping mechanism of the sealing unit onto the bags on the downstream side and the upstream side of the portion that is sealed by the sealing jaws, the sealing operation of bags by a sealing mechanism, and the tape supplying operation by a tape supplying mechanism.

SUMMARY OF THE INVENTION

In the above mentioned conventional packaging apparatus, the sealing jaws are provided with a heater for heating the film that is clamped therebetween at the time of sealing. Since the heater is always turned ON, reduction of the power consumption becomes an issue. Therefore, it is necessary to control the heat loss to other area aside from the sealing surface of the sealing jaws to reduce the power consumption.

The purpose of the present invention is to provide a bag manufacturing and packaging apparatus that reduces power consumption at the time of sealing while improving the sealing performance of sealing (for) the film.

(1) A bag manufacturing and packaging apparatus according to a first aspect of the invention is adapted to form a strip film into a cylindrical film. The bag manufacturing and packaging apparatus includes a sealing unit with a pair of sealing members facing each other to seal an end portion of the cylindrical film therebetween to package an article. Each of the sealing members includes a sealing jaw, a heating unit and a heat insulating member. The sealing jaw has a heat generating surface, and configured and arranged to seal the cylindrical film on the heat generating surface. The heating unit configured and arranged to heat the heat generating surface of the sealing jaw. The heat insulating member insulates the heat conduction from the heating unit to a direction other than a direction toward the heat generating surface of the sealing jaw.

In the bag manufacturing and packaging apparatus according to the first aspect of the invention, an article is packaged by forming a strip film into a cylindrical film and sealing the end portion of the film by the sealing unit. In the sealing unit, the cylindrical film is sealed on the heat generating surface by the sealing jaw that is heated by the heating unit. Additionally, the heat conduction from the heating unit in directions other than the direction of the heat generating surface is insulated by the heat insulating member.

In this case, since the heat conduction from the heating unit in directions other than the direction of the heat generating surface is insulated by the heat insulating member, heat loss on the heat generating surface is reduced, which improves the sealing performance for the cylindrical film. Additionally, less electric power is required while controlling the heat loss, achieving the reduction in power consumption.

(2) The heating unit may be disposed between the sealing jaw and the heat insulating member facing the sealing jaw.

In this case, introducing a configuration wherein the heating unit is disposed between the sealing jaw and the heat insulating member that is disposed facing the sealing jaw enables the area where the heating unit is held in the sealing jaw and the heat insulating member to be exposed to the outside. Consequently, since the area is formed by a cutting process, the workload can be reduced relative to the case wherein machining a through-hole in the sealing jaw that inserts a round-shaped heater as conventionally processed.

(3) The heating unit may be a heater having a prismatic-shape. In this case, for example, by holding three surfaces of a prismatic-shaped heater by the sealing jaw, and disposing the heat insulating member in the opposite direction from the direction of the heat generating surface, the heat loss in the opposite direction from the heat generating surface is reduced relative to the case wherein a round-shaped heater is used.

(4) The prismatic-shaped heater may be embedded in the sealing jaw so that three surfaces of the prismatic-shaped heater are supported by the sealing jaw, and the heat insulating member may be in contact with one surface of the prismatic-shaped heater, and the sealing jaw and the heat insulating member may be connected together.

In this case, since three surfaces of the heater being embedded are held by the sealing jaw, and the heat insulating member is disposed in the direction opposite from the direction of the heat generating surface, the heat loss in the direction opposite from the direction of the heat generating surface is remarkably reduced herewith. In addition, the sealing performance for the cylindrical film is remarkably improved. Furthermore, the heat conduction in the opposite direction from the direction of the heat generating surface is insulated by the heat insulating member, which improves the heat collecting performance on the heat generating surface, thus the sealing performance for the cylindrical film is improved. Furthermore, a plurality of heaters may be disposed in the cross direction of the heat generating surface. In this case, since the plurality of heaters are disposed in the cross direction of the heat generating surface, the temperature of the heaters disposed at both ends in the cross direction is adjusted so as to individually increase the temperature of the heaters. Therefore, the heat is conducted evenly throughout the heat generating surface to further improve the sealing performance for the cylindrical film.

Additionally, a holding portion of the sealing jaw and a holding portion of the heat insulating member that hold the prismatic-shape heater are each exposed to the outside prior to connecting thereof so as to be easily fabricated using normal cutting process. Consequently, the machining cost is reduced. In other words, a surface of the sealing jaw can be manufactured with an elongated recess, open at each end thereof, making machining of the sealing jaw simple and thereby reducing manufacturing costs.

(5) The heating unit may be a cylindrical-shaped heater, where the sealing jaw may be generally fan-shaped in cross-section that widens towards the heat generating surface. The sealing jaw and the heat insulating member may be connected together with the cylindrical-shaped heater interposed therebetween.

In this case, even when a cylindrical-shaped heater is used as the heating unit, the heat emitted radially from the heater is conducted well through the generally fan-shaped sealing jaw to the end portion of the heat generating surface. Consequently, the heat is conducted evenly throughout the heat generating surface, thus the sealing performance for the cylindrical film is improved.

(6) The sealing jaw may have a surface treatment applied thereon in order to improve the thermal fatigue characteristics. The temperatures required in sealing are normally high (for example at 200° C.), and thus the surface treatment on the sealing jaw improves the thermal fatigue characteristics of the sealing jaw. Consequently, the sealing jaw (sealing unit) can be used over an extended period of time.

The bag manufacturing and packaging apparatus according to the present invention is capable of improving the sealing performance for the film and reducing the power consumption at the time of sealing.

DESCRIPTION OF THE PREFERRED EMBODIMENTS

First Embodiment

Figure 1:
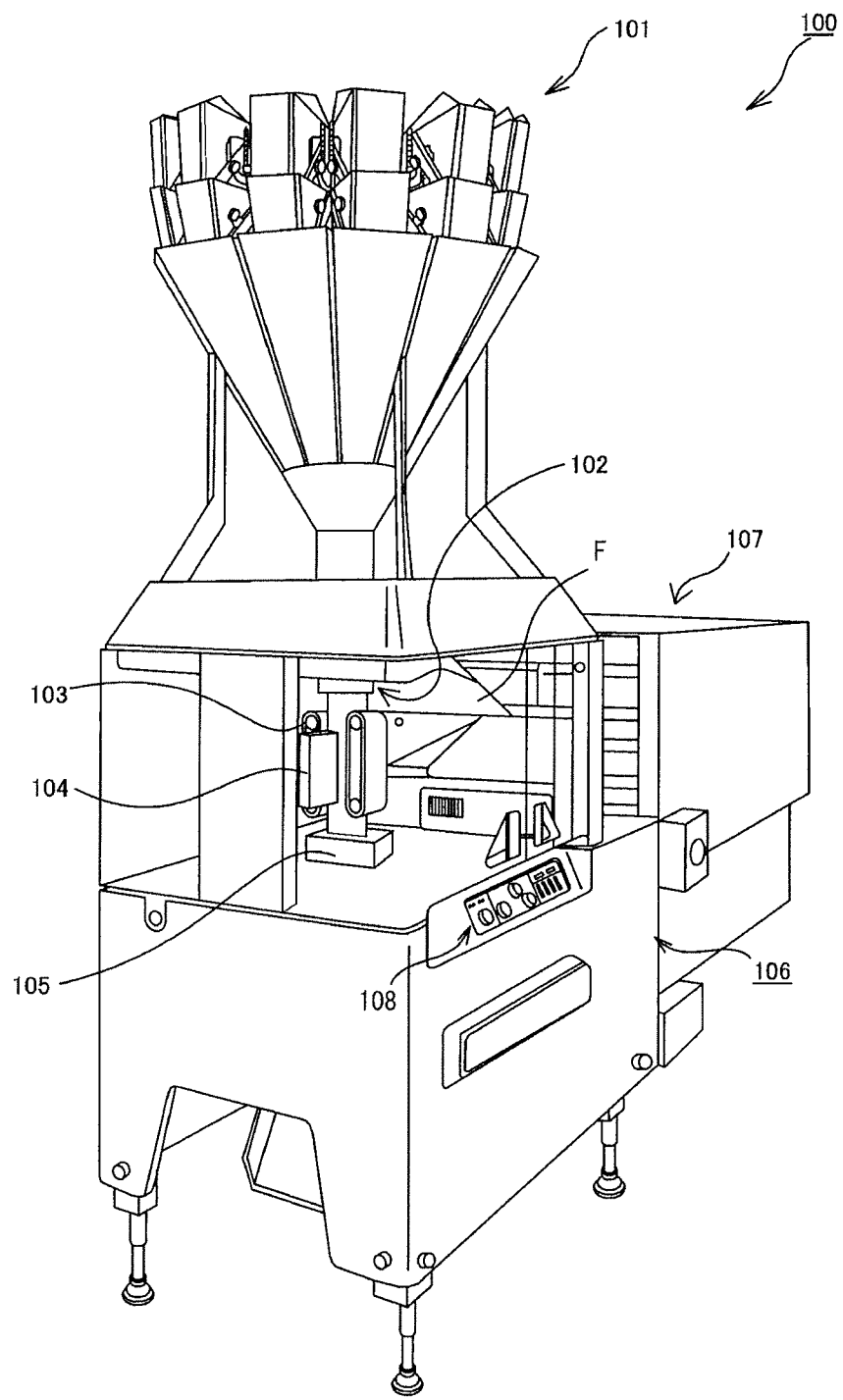
FIG. 1 is a perspective view showing a configuration of a bag manufacturing and packaging apparatus according to one embodiment of the present invention.

A bag manufacturing and packaging apparatus according to a first embodiment of the present invention will be described below in reference to the figures. FIG. 1 is a perspective view showing a configuration of the bag manufacturing and packaging apparatus 100 according to the first embodiment.

As shown in FIG. 1, the bag manufacturing and packaging apparatus 100 primarily comprises a combination weighing unit 101; a forming mechanism 102; a pull-down belt 103; a vertical sealing unit 104; a horizontal sealing unit 105; a bag manufacturing and packaging unit 106; a film supplying unit 107; and operating switches 108.

The combination weighing unit 101 measures article with a predetermined weight in a measuring hopper, then combines these measured values so as to achieve the predetermined total weight. Sequentially the combination weighing unit 101 discharges and packages the article having the predetermined total weight into a bag made from a strip film F.

The bag manufacturing and packaging unit 106 is a main unit that packages an article C. Additionally, the film supplying unit 107 supplies a strip film F to the bag manufacturing and packaging unit 106 so as to form bag W. The operating switches 108 are disposed on the front panel of the bag manufacturing and packaging unit 106.

The film supplying unit 107 is a unit that supplies the sheet-shaped strip film F to the forming mechanism 102 of the bag manufacturing and packaging unit 106, and is provided adjacent to the bag manufacturing and packaging unit 106. A film role on which the strip film F being wound is placed into the film supplying unit 107, where the strip film F is fed out from the film roll.

Figure 2:
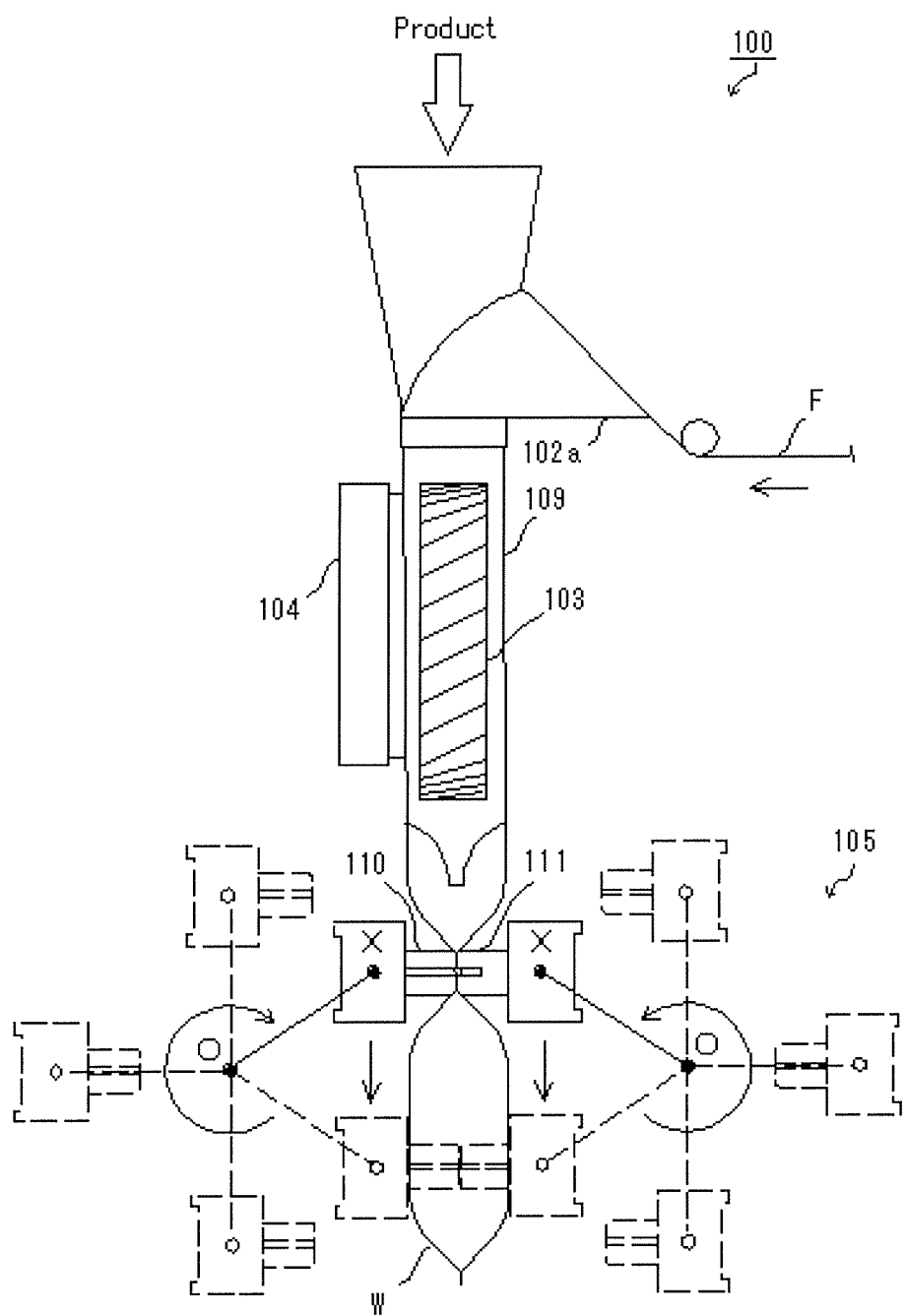
FIG. 2 is a schematic view showing a portion of the configuration of the bag manufacturing and packaging apparatus in FIG. 1.

FIG. 2 is a schematic view showing a portion of the configuration of the bag manufacturing and packaging apparatus 100 in FIG. 1. As shown in FIG. 2, the strip film F having the property of heat fusibility such as a synthetic resin or the like is conveyed by a conveying unit, not shown, and formed into a cylindrical film F by a former 102a of the forming mechanism 102 in the bag manufacturing and packaging apparatus 100. Then the cylindrical film F is suspended around a tube 109 and overlaid edge portions are heat-fused by the vertical sealing unit 104 to seal vertically, as conveyed further in the downward direction by the pull-down belt 103. Thereafter, the overlaid edge portions are heat-fused and sealed in a horizontal direction by the horizontal sealing unit 105 to manufacture the bag W. Article are packaged to the bag W from the above through the tube.

The horizontal sealing unit 105 has a pair of sealing members 110 and 111 that holds the cylindrical film F. As configuration members, the sealing members 110 and 111 include a sealing jaw 110a, a heat insulating member 110b as configuration members, a sealing jaw 111a, and a heat insulating member 111b described below. However the sealing members 110 and 111 move symmetrically along paths having generally a shape of D, thus the sealing members 110 and 111 do not interfere with the consecutive conveyance of the film F.

Furthermore, the sealing members 110 and 111 each rotates around an axis X while pivoting around a pivot O and holding a state in which the sealing surfaces of the sealing members 110 and 111 face each other.

Figure 3:
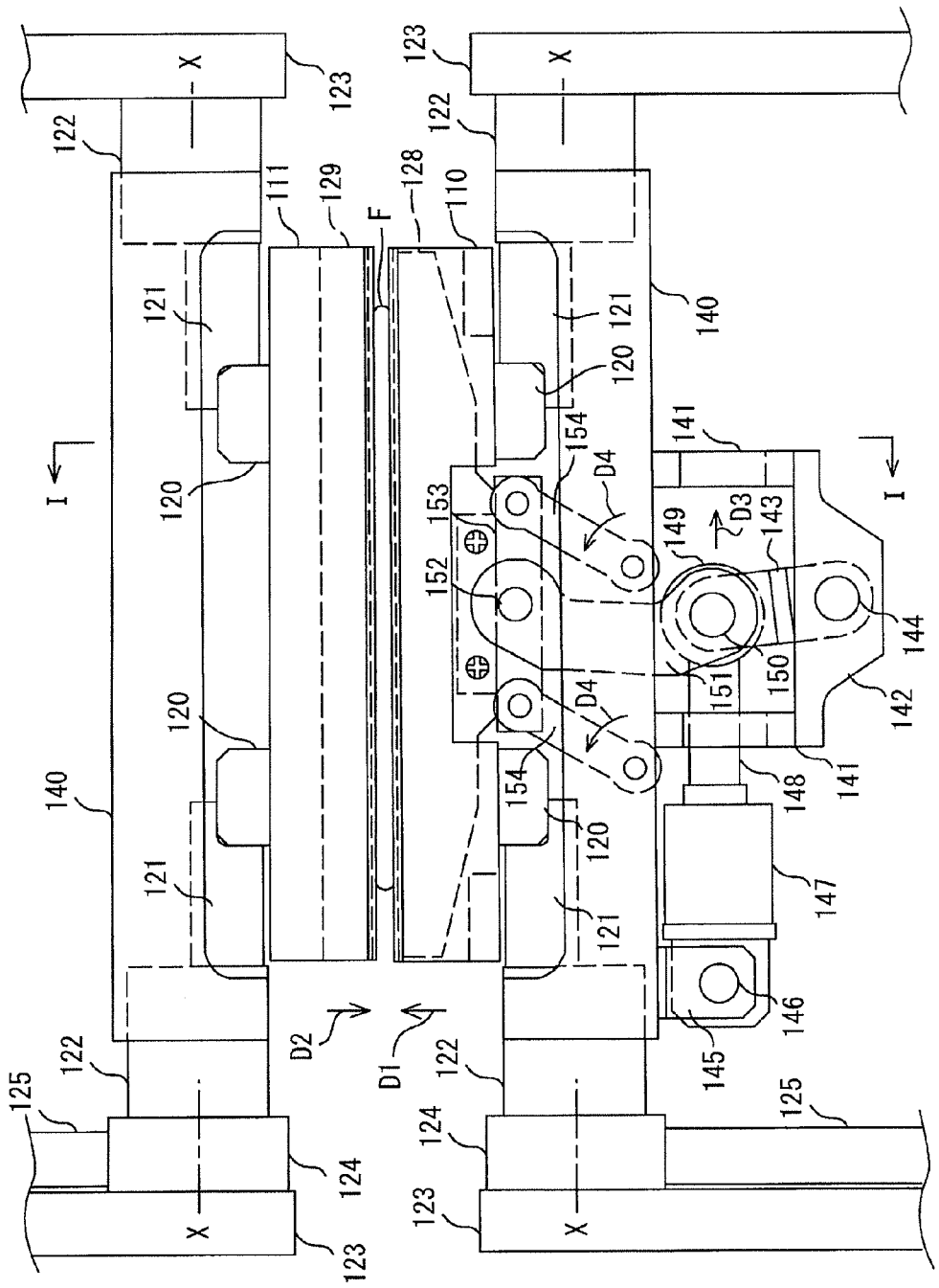
FIG. 3 is an enlarged plan view of the area of the horizontal sealing mechanism of the bag manufacturing and packaging apparatus in FIG. 1.

FIG. 3 is an enlarged plan view of the area of the horizontal sealing mechanism of the bag manufacturing and packaging apparatus 100 in FIG. 1. As shown in FIG. 3, the sealing members 110 and 111 are connected to a bearing box 122 respectively through a right-and-left pair of heat insulating blocks 120 and attachment blocks 121.

Each bearing box 122 rotatably holds a shaft (not shown) that includes the axis X, where the shaft is suspended between a pair of right-and-left swivel arms 123. In addition, a unit 124 for rotating the sealing members 110 and 111 around the axis X is disposed adjacent to one of the swivel arms 123 (on the left side in the figure). A timing belt 125 for maintaining the sealing members 110 and 111 in an identical position is provided between the unit 124 and the pivot O.

A spacer portion, not shown, is formed on the sealing jaw 110a (described below) of the sealing member 110, and a pressing member 128 is provided on the spacer portion. Additionally, a groove, not shown, is formed in the sealing jaw 111a (described below) of the sealing member 111, and a receiving member 129 is provided in the groove.

The pressing member 128 is capable of moving freely to the receiving member 129 and capable of separating from the receiving member 129 while the receiving member 129 is fixed on the sealing jaw 111a (described below). The pressing member 128 and the receiving member 129 are omitted from the drawing in FIG. 4 described below.

Figure 4:
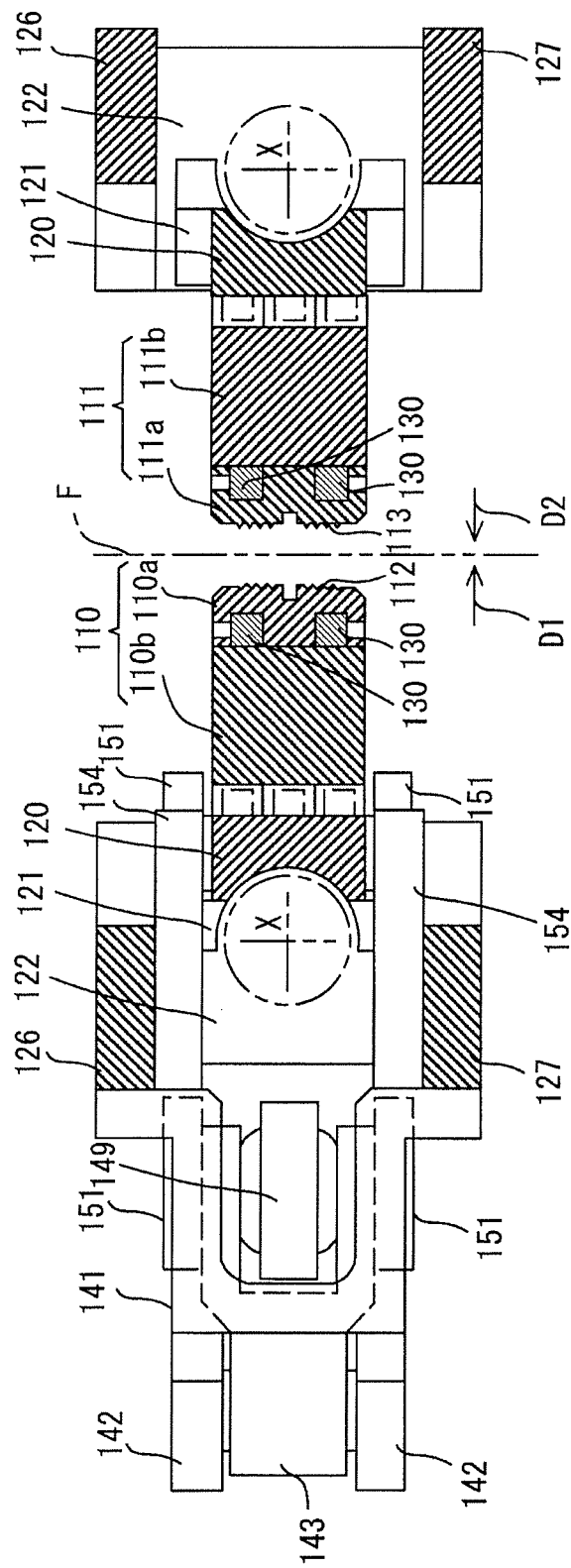
FIG. 4 is a cross-sectional view of the side view on arrow along the section I-I in FIG. 3.

FIG. 4 is a cross-sectional view of the side view indicated by the arrow along the section I-I in FIG. 3. In reference to FIG. 3 and FIG. 4, the moving method of the pressing member 128 will be described. A pair of right and left arm members 141 is mounted onto the back portion of one of the jaw frames 140, and top and bottom pair of support plates 142 is mounted onto each of the arm members 141.

A first support shaft 144 that extends vertically is bridged between the each support plates 142 where one end portion of a first link 143 is supported rotatably on the first support shaft 144. Furthermore, a support bracket 145 is assembled to a side of the arm member 141 on the back of the first jaw frame 140. An air cylinder 147 is supported rotatably on a support rod 146 of the support bracket 145. Additionally, a rod end 149 of a rod 148 of the air cylinder 147, and the other end portion of the first link 143 are connected by a second support shaft 150.

One end portion of a second link 151 is connected to the second support shaft 150. Second link 151 is provided in a top and bottom pair so as to avoid an interference with a shaft, not shown, that includes the axis X. The other end portion of the second links 151 is connected to a base member 153 through a third support shaft 152.

The base member 153 is supported by the pressing member 128 while the back end portion of the pressing member 128 is being screwed, thus the base member 153 is swingably operated within a horizontal surface by top, bottom, left, and right swaying links 154. As a result, the pressing member 128 can approach the receiving member 129 and extend from the sealing surface of the sealing jaw 110a, and can separate from the receiving member 129.

As shown in FIG. 4, the bearing box 122 is fixed between the jaw frame 126 and the jaw frame 127. A heat insulating block 120 and an attachment block 121 have arc-recessed shapes on the back surfaces thereof so as to avoid interferences with the shafts that include the X axes.

Two prismatic-shape heaters 130 are embedded in each of the sealing members 110 and 111. The heaters 130 heat the sealing members 110 and 111, the pressing member 128, and the receiving member 129.

In the first embodiment of the present invention, the sealing members 110 and 111 include the sealing jaws 110a and 111a, which hold three surfaces of the heaters 130 through embedding the respective prismatic-shape heaters 130, and include also the heat insulating members 110b and 111b which contact the other surface of each of the heaters 130. That is, each of the heaters 130 are disposed between the respective sealing jaws 110a and 111a and the heat insulating members 110b and 111b that are disposed facing the sealing jaws 110a and 111a. In the first embodiment, for example, FRP (Fiber Reinforced Plastic) is used for the heat insulating members 110b and 111b from the perspective of heat durability and weight, and from the perspective of high-strength.

Sealing portions 112 and 113 for sealing operation are formed on the sealing jaws 110a and 111a, respectively. The sealing jaw 110a and the heat insulating member 110b are connected together, and the sealing jaw 111a and the heat insulating member 111b are connected together. In this way, in the first embodiment, the sealing members 110 and 111 are each disposed divided into two members each: the sealing jaws 110a and 111a, and the heat insulating members 110b and 111b. The heat insulating members 110b and 111b insulate the heat conduction from the heaters 130 in directions other than the directions of the respective sealing portions 112 and 113.

Figure 5:
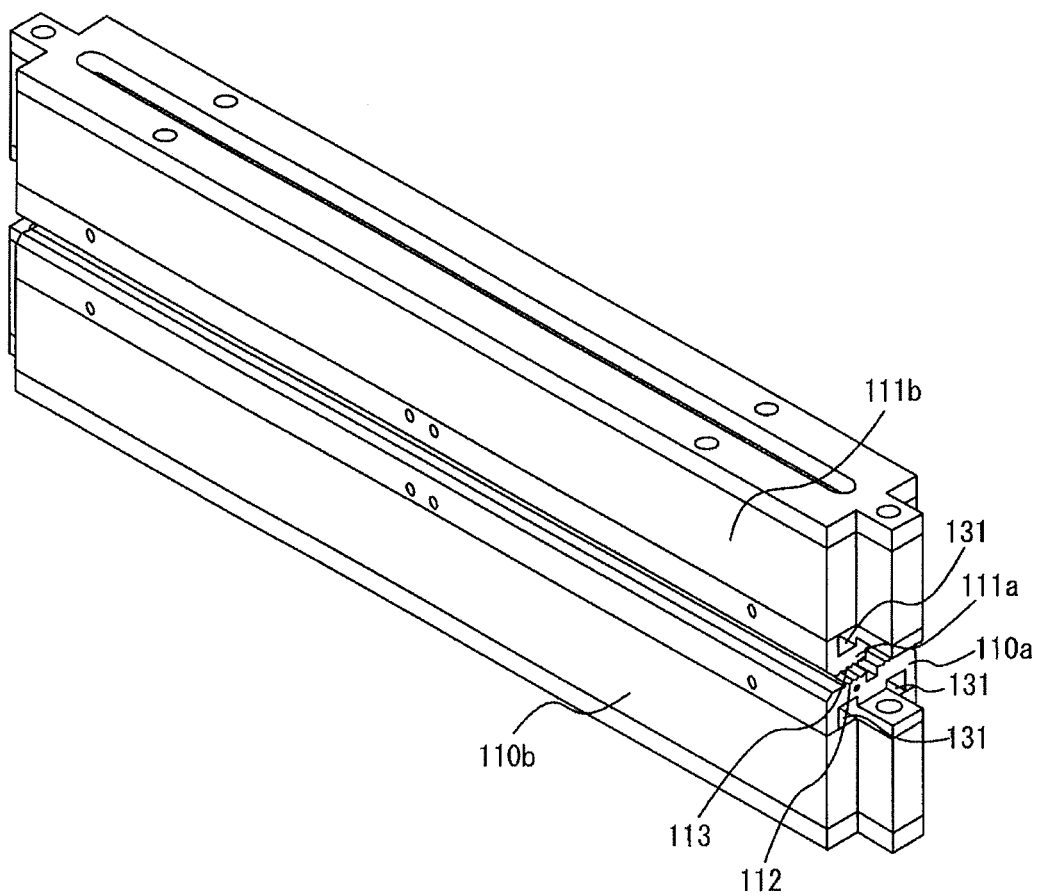
FIG. 5 is a schematic perspective view of the configurations of the individual sealing members.
Figure 6:
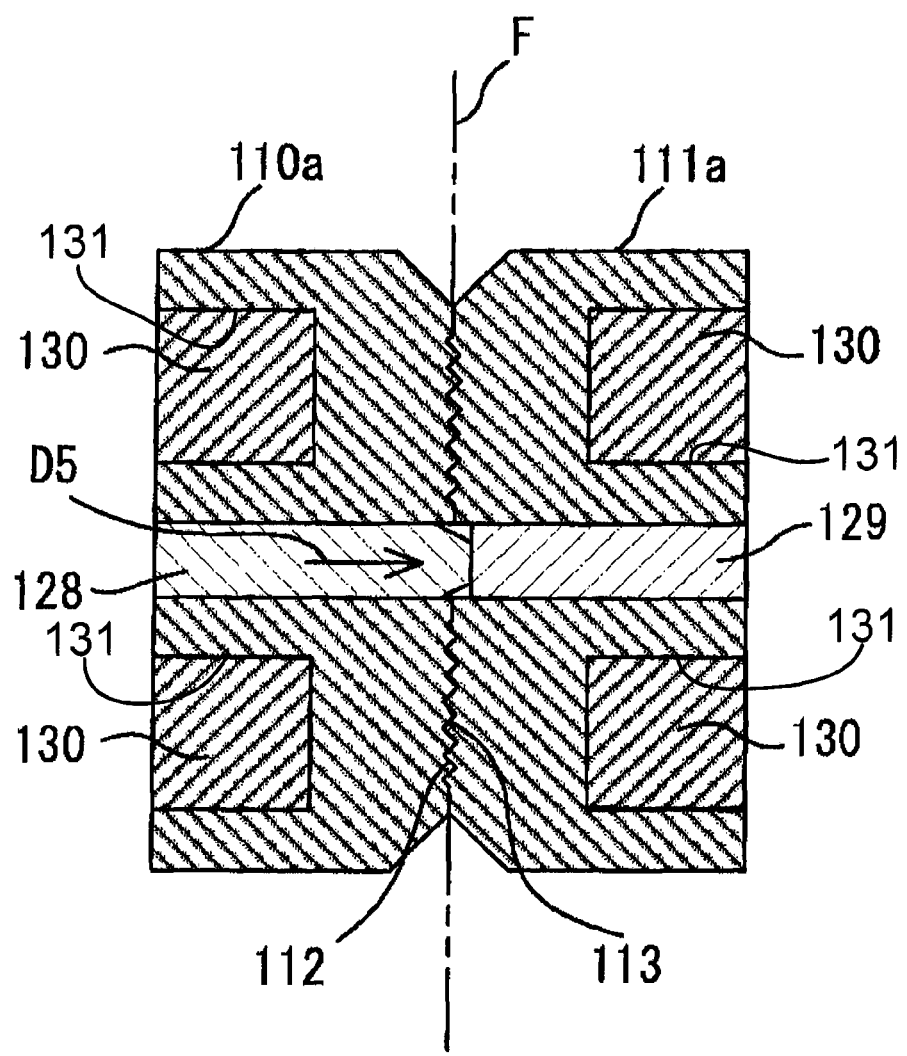
FIG. 6 is a partial enlarged view of FIG. 4 that shows a pressing member pressing towards a receiving member.

FIG. 5 is a schematic perspective view showing the configuration of the sealing members 110 and 111. As shown in FIG. 5, the sealing jaws 110a and 111a each have a heater holding portion 131 for holding the heaters 130. The heater holding portions 131 are elongated recesses, defining a square shape, when viewed in cross-section in FIG. 6. The heater holding portions 131 are formed through a normal machining process. The heater holding portions 131 have open ends, as shown in FIG. 5. More specifically, the heater holding portions 131 are elongated recesses with open ends. Each of the heater holding portions 131 includes a heater 130 is embedded into the respective heater holding portion 131. Each of the sealing members 110 and 111 includes a pair of heater holding portions 131. Each pair of heater holding portions 131 extends parallel to one another. Each heater 130 has six sides, since each heater 130 is prismatic-shaped, and as indicated in FIG. 6, each heater 130 has a square shape in cross-section. Three sides of each heater 130 contacts a corresponding surface of the heater holding portion 131 (the elongated recess), as shown in FIG. 5. A fourth side of each heater 130 contacts a surface of a corresponding one of the insulators 110b and 111b, as shown in FIG. 4. Since the heater holding portions 131 all have open ends, corresponding ends of the heaters 130 are uncovered or exposed, as indicated in FIG. 5.

Additionally, surface treatments are applied to the sealing jaws 110a and 111a to improve the thermal fatigue characteristics. For example, the surface treatments are TECHNO PHOS Treatments (fluororesin impregnated electroless nickel plating) with a film thickness between 5 and 10 µm.

The main operations of the bag manufacturing and packaging apparatus 100 with the configurations will be described next.

As shown in FIG. 2, in the bag manufacturing and packaging apparatus 100 according to the first embodiment, a cylindrical film F is consecutively conveyed, and the sealing member 110 and the sealing member 111 pivot symmetrically and synchronously around the respective pivots O.

Over the interval while the sealing members 110 and 111 are clamped onto the cylindrical film F, between where they mutually approach at the top, and where they separate from each other at the bottom, the cylindrical film F is sealed in the horizontal direction to form the bag W.

FIG. 6 is a partial enlarged view of FIG. 4 that shows the state in which the pressing member 128 is pressing towards the receiving member 129. When the sealing members 110 and 111 mutually approach, clamping the cylindrical film F, the sealing member 110 and 111 approach each other as indicated by the arrows D1 and D2 (in FIG. 3). As shown in FIG. 6, the sealing portion 112 of the sealing jaw 110a of the sealing member 110 and the sealing portion 113 of the sealing jaw 111a of the sealing member 111 mutually approach.

When the air cylinder 147 is turned on at the time of the sealing operation, the rod end 149 moves to the front of the first support shaft 144 as the rod 148 moves in the direction indicated by the arrow D3 (FIG. 3). Thereafter, the rod end 149, the second support shaft 150, one end portion of the first link 143, and one end portion of the second link 151 move forward, and the second link 151 moves the base member 153 and the pressing member 128 forward, through the other end portion of the second link 151 and the third support shaft 152.

As a result, the base member 153 and the pressing member 128 move along in the direction indicated by the arrow D4 through each of the swaying links 154 so that the pressing member 128 extends from the sealing surface of the sealing jaw 110a so as to approach the receiving member 129.

Additionally, as indicated by the arrow D5 in FIG. 6, the pressing member 128 goes into a pressing state towards the receiving member 129 to melt and cut the cylindrical film F while sealing.

On the other hand, when the air cylinder 147 is turned off, the rod 148 retracts, and the rod end 149 moves in the opposite direction from that indicated by the arrow D3. As a result, the base member 153 and the pressing member 128 swing in the opposite direction from that of indicated by the arrow D4, thus the pressing member 128 separates from the receiving member 129.

Turning on or off the air cylinder 147 changes the pressing member 128 in a pressing state or a non-pressing state relative to the receiving member 129 so as to control the cutting operation mode to the bag W.

Figure 7:
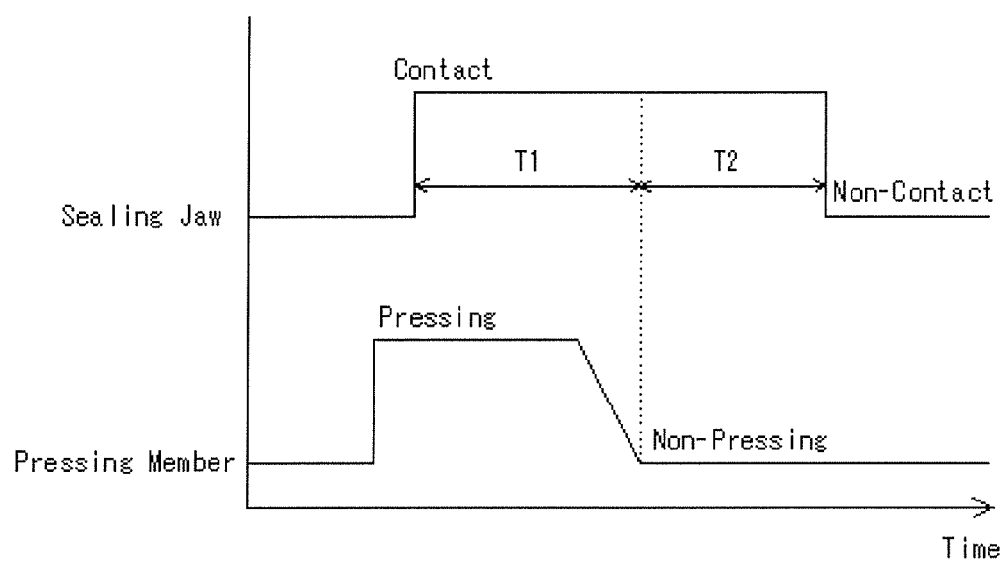
FIG. 7 is a timing diagram showing the operation timing of the sealing jaw and the pressing member.

FIG. 7 is a timing diagram showing the operation timing of the sealing jaws 110a and 111a, and the pressing member 128.

As shown in FIG. 7, in the operation timing of the sealing jaws 110a and 111a, preferably the pressing member 128 is switched from the pressing state to the non-pressing state during the time interval T1, wherein the sealing operation by mutual approach of the sealing jaws 110a and 111a is in process.

When the pressing member 128 is maintained in the pressing state, the sealing jaws 110a and 111a both rise relative to its proper position, which reduces the relative mutual approach force. As a result, the sealing performance for the cylindrical film F tends to deteriorate.

As described above, by switching the pressing member 128 from the pressing state to the non-pressing state before the sealing jaws 110a and 111a start mutually non-approach state, the time interval T1, wherein the mutual approach force decreases, is reduced, and the time interval T2, wherein the sealing jaws 110a and 111a are in mutual approach, is increased. Therefore, the large mutual approach force, which is necessary for sealing of the cylindrical film F, is maintained over an extended period of time. As a result, the sealing performance for the cylindrical film F is strengthened.

Effects of First Embodiment

In the first embodiment, prismatic-shaped heaters 130 are used in the sealing members 110 and 111. The heat is linearly supplied within the shortest time towards the sealing portions 112 and 113 while the conventional round-shaped heater supplies the heat radially. As a result, the heat loss in the sealing portions 112 and 113 is reduced. Thereby, the sealing performance for the cylindrical film F is improved. Since three surfaces of the heater 130 are held by the sealing jaw 110a (111a), the heat loss in the direction opposite from the direction of the sealing portion 112 (113) is remarkably reduced, that achieves a remarkable improvement in the sealing performance for the cylindrical film F. Consequently, the excess electric power is also reduced due to the heat loss reduction, achieving reduction in power consumption. As a referential value, the energy saving effect is expected to be reduced by about 30% relative to when using the conventional round-shaped heaters. Additionally, as a result of the heat loss reduction, the temperature responsiveness of the sealing jaws 110a and 111a will improve, thus controlled performance and temperature stabilization are achieved.

Additionally, the use of the prismatic-shaped heaters 130 in the first embodiment enables reduction in volume by about 60%, and reduction in surface area by about 45% relative to when the conventional round-shaped heaters are used. Consequently, the reduction in weight and in size is also achieved. The heat transfer to the area other than to the sealing portion 112 (113) is sufficiently controlled while maintaining the mechanical strength.

Additionally, the heat transfer to the opposite direction from the direction of the sealing portion 112 (113) is insulated by the heat insulating member 110b (111b), thus the heat collecting performance on the sealing portion 112 (113) is improved. Consequently, the sealing performance for the cylindrical film F is improved.

Additionally, a round-shaped heater has been conventionally used. In order to hold the round-shaped heater it was necessary to provide a long through hole in a holding member by gun drill process, which increased the machining costs. In contrast, in the present invention, the sealing members 110 and 111 are disposed divided into two members (the sealing jaws 110a and 111a and the heat insulating members 110b and 111b), and the areas wherein the heaters 130 are held in the sealing jaws 110a and 111a are exposed to the outside, the heater holding portions 131 that hold the prismatic-shaped heaters 130 is fabricated into a recessed shape by a normal cutting process, and thereby the machining cost is reduced.

Furthermore, in this embodiment, a surface treatment is applied on the sealing jaws 110a and 111a in order to improve the thermal fatigue characteristics. The temperature required for sealing is normally high (for example, 200° C.), and thus the thermal fatigue characteristics is improved by the surface treatment on the sealing jaws 110a and 111a.

Second Embodiment

Configurations of the sealing members in a second embodiment are different in the following points from that of the sealing members 110 and 111 in the first embodiment described above. Multiple examples of different configurations for sealing members will be described below.

Figure 8:
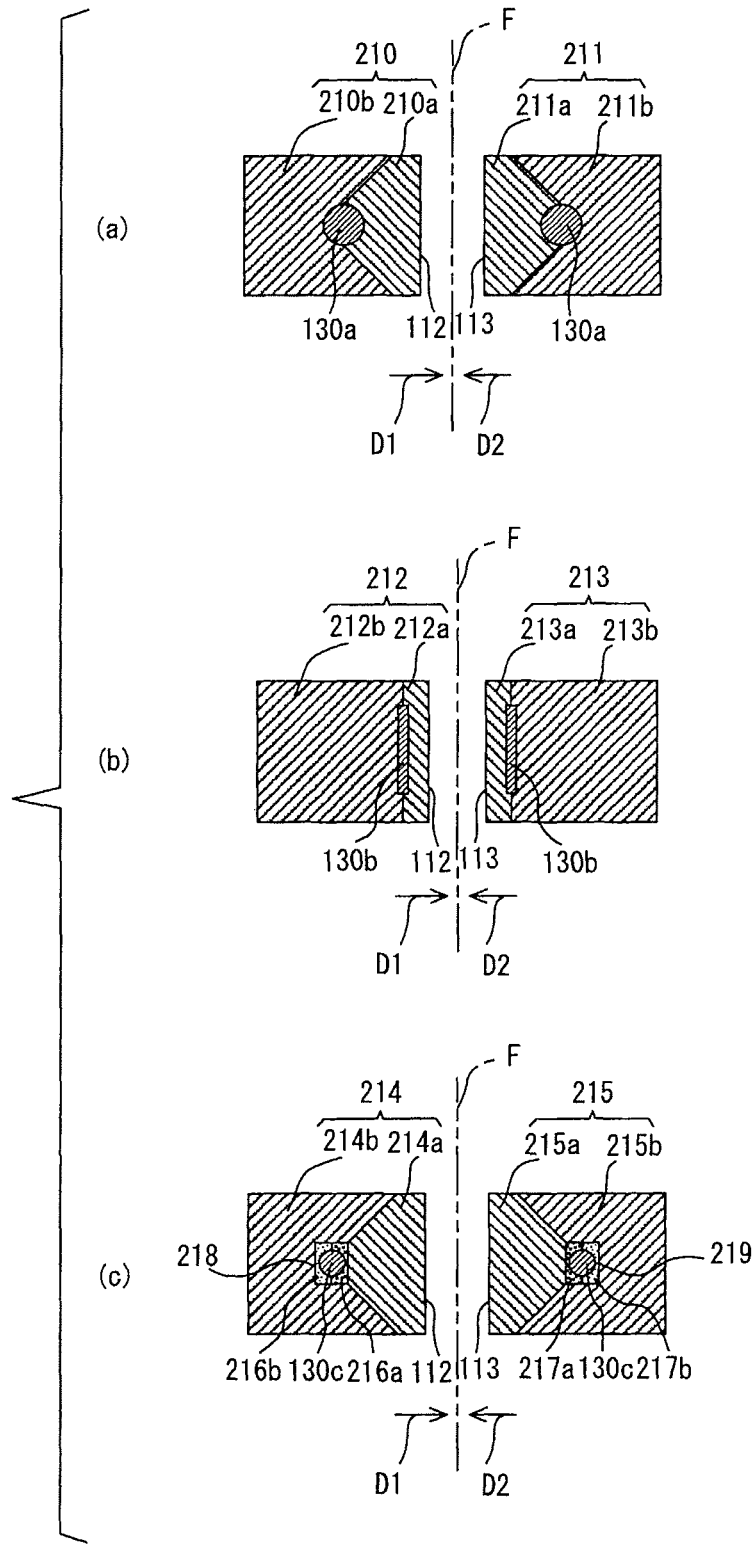
FIG. 8 is a cross-sectional view showing a configuration of sealing members according to a second embodiment.

FIG. 8 is a cross-sectional view showing the configuration of sealing members. The same codes are assigned to the components that are identical to those in the first embodiment.

As shown in FIG. 8(a), the sealing members 210 and 211 are each provided with the sealing jaws 210a and 211a and the heat insulating members 210b and 211b disposed opposite thereof. The cylindrical heaters 130a are disposed between the sealing jaw 210a and the heat insulating member 210b and between the sealing jaw 211a and the heat insulating member 211b.

The sealing jaws 210a and 211a each are generally fan-shaped as shown in a cross-sectional view of FIG. 8(a) that widens towards the sealing portions 112 and 113. As a result, when the cylindrical heaters 130a are used as heating units, heat produced radially by the heater 130a is conducted well to the end surface of the sealing portions 112 and 113 through the generally fan-shaped sealing jaws 210a and 211a. Furthermore, the heat transfer in the direction opposite from the direction of the sealing portions 112 and 113 is insulated by the heat insulating members 210b and 211b, thereby the heat collecting performance on the sealing portions 112 and 113 is improved. Consequently, the sealing performance for the cylindrical film F is improved while the heat is conducted evenly over the entire area of the sealing portions 112 and 113.

Additionally, as another example, the sealing members 212 and 213 are provided with the sealing jaws 212a and 213a and the heat insulating members 212b and 213b disposed opposite thereof respectively, as shown in FIG. 8(b). A flat-shaped heater 130b is disposed between the sealing jaw 212a and the heat insulating member 212b, and between the sealing jaw 213a and the heat insulating member 213b.

In the example in FIG. 8(b), multiple heaters 130 are not disposed in the sealing members 110 and 111 described in the first embodiment (referencing FIG. 4), however the flat-shaped heaters 130b that have a height that is close to the height of the sealing portions 112 and 113 disposed in the sealing members 212 and 213. As a result, the heat produced by the heaters 130b is conducted well to the end surface of the sealing portions 112 and 113. Additionally, the heat transfer in the opposite direction from the direction of the sealing portions 112 and 113 is insulated by the heat insulating members 212b and 213b. As a result, the heat collecting performance on the sealing portion 112 and 113 is improved. Consequently, the heat is conducted evenly to the entire areas of the sealing portions 112 and 113. Therefore the sealing performance for the cylindrical film F is further improved. Additionally, the areas wherein the heaters 130b are held in the sealing jaws 212a and 213a can be exposed to the outside, which enables the clamping area to be formed into a recessed shape by a normal cutting process. As a result, the machining cost is reduced.

Furthermore, as another example, the sealing members 214 and 215 are each provided with the sealing jaws 214a and 215a and the heat insulating members 214b and 215b disposed opposite thereof as shown in FIG. 8(c). A cylindrical heater 130c is disposed between the sealing jaw 214a and the heat insulating member 214b, and between the sealing jaw 215a and the heat insulating member 215b respectively.

Recessed portions 218 and 219 are provided in the heat insulating members 214b and 215b respectively. The heaters 130c are provided in the recessed portions 218 and 219. A heat transfer material 216a is filled and hardened between the sealing jaw 214a and the heat insulating member 214b, and the heater 130c. On the other hand, a heat insulating material 216b is filled and hardened between the heat insulating member 214b and the heater 130c. Additionally heat transfer material 217a is filled and hardened between the sealing jaw 215a and the heat insulating member 215b and the heater 130c. On the other hand, heat insulating material 217b is filled and hardened between the heat insulating member 215b and the heater 130c.

With the configurations described above, the holding area for the heaters 130c is not required to be cylindrical even when the cylindrical heaters 130c are used as heating units. By using the recessed portions 218 and 219 as the holding area for the heaters 130c, it is not necessary to machine through holes to hold the heaters 130c, consequently the machining performance is improved. Additionally, while there is a gap between the recessed portion 218 and the heater 130c, and between the recessed portion 219 and the heater 130c, in the present example, the heat transfer materials 216a and 217a are filled and hardened on the sealing jaws 214a and 215a sides of these gaps, and heat insulating materials 216b and 217b are filled and hardened on the heat insulating member 214b and 215b sides of these gaps, respectively, thereby the loss of both heat transfer and the heat insulation are reduced and prevented. Consequently, the heat loss is reduced and excess electric power is not required, thereby power consumption is reduced.

In the examples of embodiment described above, the bag manufacturing and packaging apparatus 100 corresponds to a bag manufacturing and packaging apparatus; the horizontal sealing unit 105 corresponds to a sealing unit; the cylindrical film F corresponds to a cylindrical film; the sealing jaws 110a, 111a, 210a, 211a, 212a, 213a, 214a, and 215a correspond to sealing jaws; the heat insulating members 110b, 111b, 210b, 211b, 212b, 213b, 214b, and 215b correspond to heat insulating members; the sealing portions 112 and 113 correspond to heat generating surfaces; and the heaters 130, 130a, 130b, and 130c correspond to heating units.

Modified Embodiments

As an alternative to the heater 130, a polygonal-shaped heater may be used such as a hexagonal-shaped heater.

In the above mentioned embodiment, two heaters 130 were provided in each of the sealing members 110 and 111. However the present invention is not limited thereto. Three or more than three heaters 130 may be provided.

In the above mentioned embodiment, the sealing members 110 and 111 with particular configuration are used in the horizontal sealing unit 105. However the present invention is not limited thereto. The sealing members 110 and 111 may be used in the vertical sealing unit 104.

In the above mentioned embodiment, the sealing members 110 and 111 are comprised of two separate members; the sealing jaws 110a and 111a, and the heat insulating members 110b and 111b. However the present invention is not limited thereto. The sealing members 110 and 111 may be comprised of a single member provided with a holding portion for holding the heater 130 inserted.

In the above mentioned embodiment, the sealing members 110 and 111 move symmetrically following paths that are generally D shapes for sealing the cylindrical film F while clamping the same. However the present invention is not limited thereto. The sealing member 110 and 111 may approach each other and separate from each other in the horizontal direction for sealing the cylindrical film F.

Figure 9:
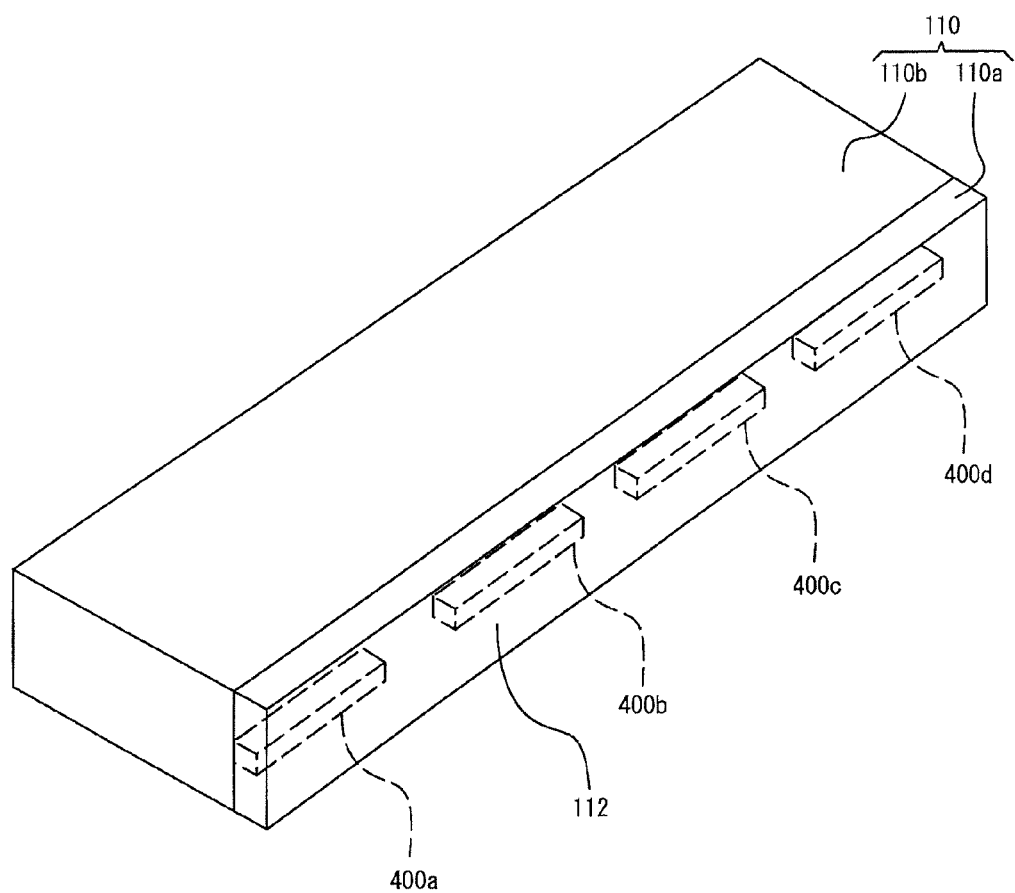
FIG. 9 is a schematic perspective view showing the configuration of a heater according to another embodiment.

In addition, as shown in FIG. 9, a plurality of heaters 400a, 400b, 400c, and 400d may be disposed by leaving the spaces separately between each heater along the horizontal direction of the sealing portion 112. In this case, disposing the plurality of heaters 400a, 400b, 400c, and 400d separately along the horizontal direction of the sealing portion 112 enable the temperatures of the heaters 400a and 400d which are disposed at both ends on the sealing portion 112, to be adjusted to increase the temperatures individually, thus the heat is conducted evenly across the entire area of the sealing portion 112, which improves the sealing performance for the cylindrical film F. In addition, the plurality of heaters may also be applied to the sealing member 111. The configuration in which the plurality of heaters separately disposed along the horizontal direction may be applied to only one of the sealing members 110 or 111.

While only selected embodiments have been chosen to show the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A bag manufacturing and packaging apparatus adapted to form a strip film into a cylindrical film, the bag manufacturing and packaging apparatus comprising:
  a sealing unit with a pair of sealing members facing each other to seal an end portion of the cylindrical film therebetween to package an article, each of the sealing members including
    a sealing jaw having a heat generating surface and an elongated recess with open ends, the sealing jaw being configured and arranged to seal the cylindrical film on the heat generating surface,
    a prismatic-shaped heater embedded in the sealing jaw such that three surfaces of the prismatic-shaped heater contact corresponding surfaces of the elongated recess of the sealing jaw with opposing end surfaces of the heater being exposed at corresponding open ends of the elongated recess, the heating being configured and arranged to heat the heat generating surface of the sealing jaw, and
    a heat insulating member contacts and covers another surface of the heater, the heat insulating member insulating heat conduction from the heater to a direction other than a direction toward the heat generating surface of the sealing jaw, the sealing jaw and the heat insulating member being connected together.

2. The bag manufacturing and packaging apparatus according to claim 1, wherein
  the heater is disposed between the sealing jaw and the heat insulating member which faces the sealing jaw.

3. The bag manufacturing and packaging apparatus according to claim 1, wherein
  a surface of the sealing jaw is treated in advance to exhibit improved thermal fatigue characteristics.

4. The bag manufacturing and packaging apparatus according to claim 1, wherein
  the heater has a rectangular shape.

5. The bag manufacturing and packaging apparatus according to claim 1, wherein
  the elongated recess of the sealing jaw has a rectangular shape with open ends at each end of the sealing jaw.

6. The bag manufacturing and packaging apparatus according to claim 1, wherein
  the elongated recess comprises a first elongated recess and a second elongated recess that extends parallel to one another, and
  the heater includes a first heater and a second heater with the first heater being disposed in the first elongated recess and a second heater disposed in the second elongated recess.

7. The bag manufacturing and packaging apparatus according to claim 6, wherein
  the heat insulating member includes a surface that contacts and covers a surface of the first heater and a surface of the second heater.

* * * * *